United States Patent Office 3,516,843
Patented June 23, 1970

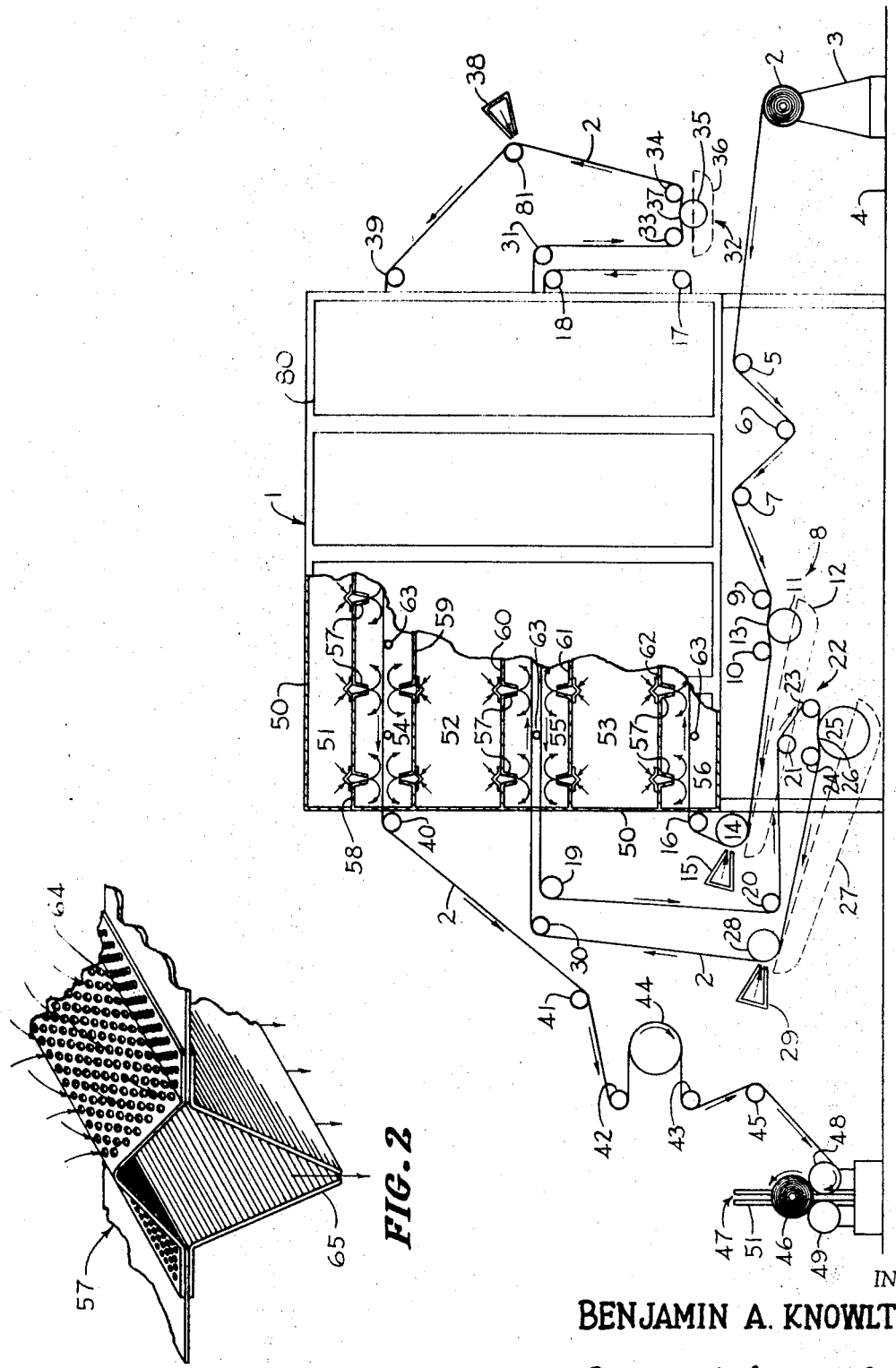
INVENTOR
BENJAMIN A. KNOWLTON, JR.
BY John Kirkland Smith, Jr.
ATTORNEY

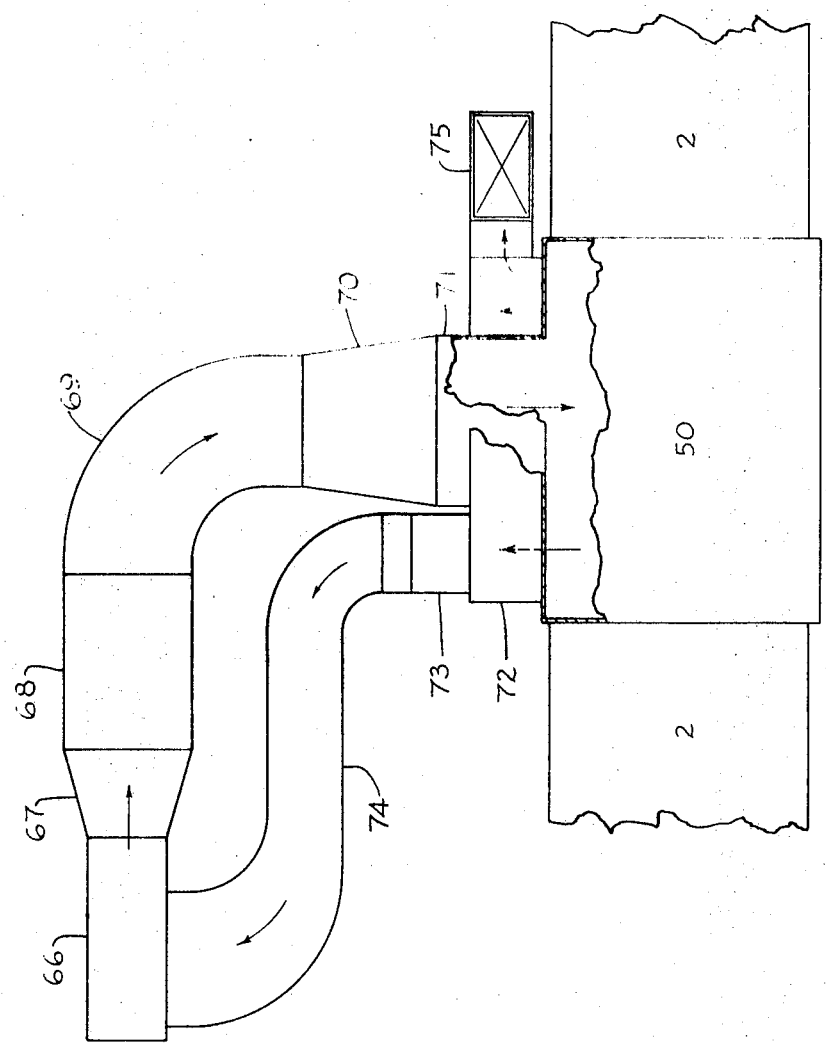

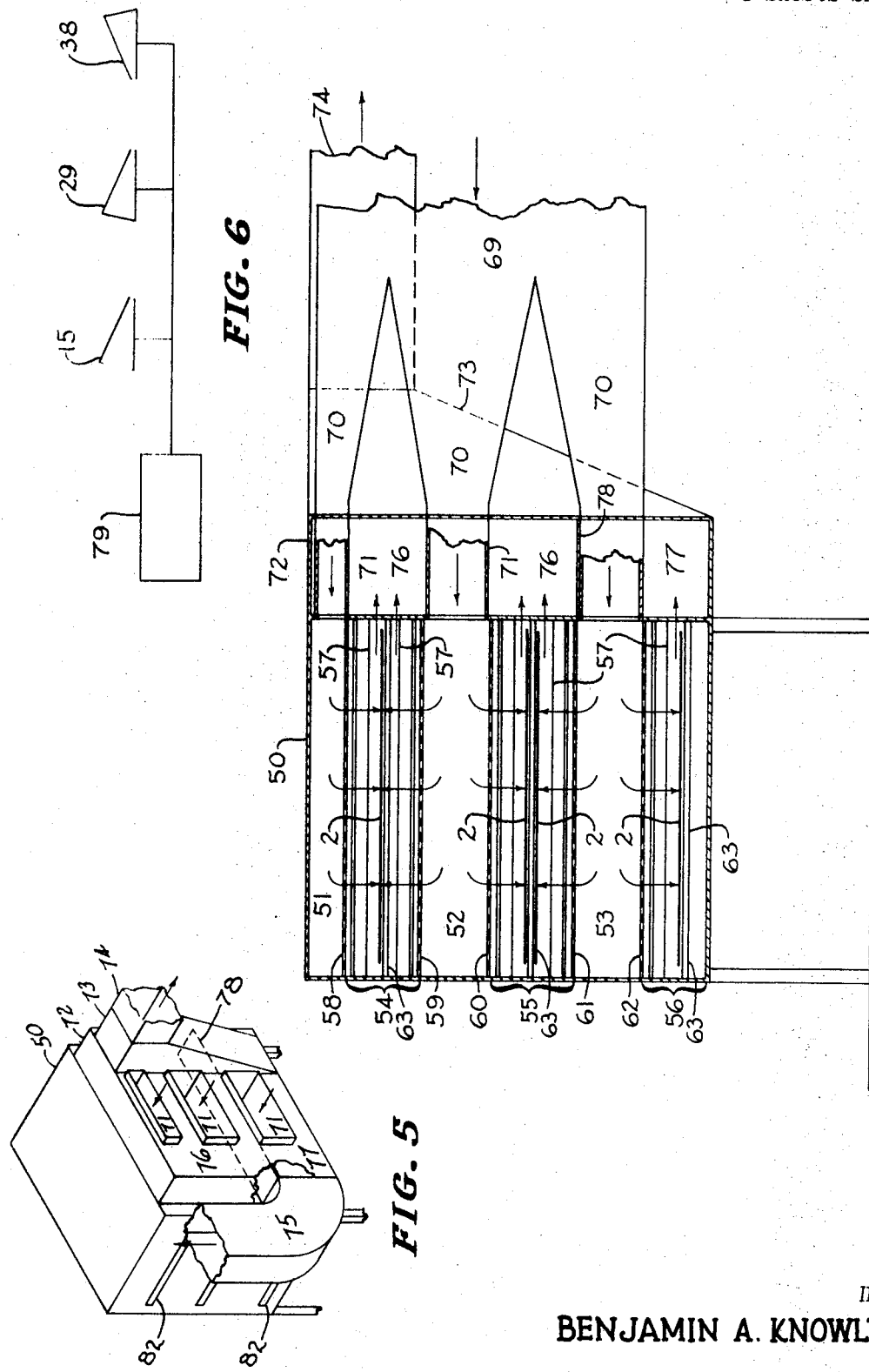

3,516,843
DIAZO PAPER SENSITIZING PROCESS
Benjamin A. Knowlton, Jr., 1301 Sanford Drive,
Columbia, S.C. 29206
Filed Sept. 26, 1962, Ser. No. 226,213
Int. Cl. B44d 1/48; G03c 11/06
U.S. Cl. 117—34                                    4 Claims

ABSTRACT OF THE DISCLOSURE

A continuous coating process wherein one side of the paper is coated with a diazotype precoat solution and dried, the precoated paper is overcoated with a diazo solution and partially dried, and then the paper is wetted on the uncoated side and dried. The drying steps utilize intermittent jets of hot air directed forcefully against the treated surface in narrow strips. The major portion of dissipated drying air is reheated and recirculated to the air jets with a portion being replaced to keep the moisture content below saturation. An excess of coating and wetting solutions is applied at each treating station and thereafter removed by air knives.

---

This invention pertains to a new and useful high velocity coater. More particularly, this invention pertains to new and useful apparatus and process for chemically treating raw paper so as to convert same into a finished diazo paper superior to that diazo paper heretofore known.

It is the primary object of this invention to provide apparatus and process for treating diazo paper whereby the finished product will be of equal density throughout.

It is an object of this invention to dry the paper evenly, thereby effecting a uniform moisture content across the entire width of the paper.

It is an object of this invention to remove the moisture from the applied chemical without directly affecting the paper.

It is an object of this invention to provide means to eliminate the heretofore known wrinkles and curls in the paper under treatment.

It is an object of this process invention to provide a plurality of chemical applications and drying steps in which the first chemical applied is completely dried before the sequential chemical applications.

It is an object of this invention to eliminate the heretofore known over-exposure of the paper to heat.

It is an object of this invention to provide longitudinally spaced jets of hot air to effect intermittent drying impulses.

It is an object of this invention to provide a plurality of jets extending without interruption the width of the paper undergoing treatment.

It is an object of this invention to employ high velocity recirculating hot air.

It is an object of this invention to provide economical structure insofar as floor space consumption is concerned.

These and other objects will be more apparent to those skilled in the art upon a consideration of the following specification and accompanying drawings wherein is disclosed a single exemplary embodiment of the invention.

In the drawings:

FIG. 1 is a diagrammatic longitudinal sectional elevation of the drying unit showing the relationship of the paper, chemical application steps, hot air jets, and air scrapes.

FIG. 2 is an isometric view of the jet arrangement.

FIG. 3 is a top view showing the relationship of the major components of the invention.

FIG. 4 is an end view of the drying unit showing the associated plenum chamber, the intake and exhaust ducts, the relationship of the jets and the paper under treatment.

FIG. 5 is an isometric partial section view of the drying unit, the plenum chamber and the duct work.

FIG. 6 is a schematic diagram of the air scrape mechanisms.

FIG. 1

FIG. 1 shows generally the invention 1 having a roll of suitable paper 2 mounted for unrolling on a suitable stand 3 which, in turn, rests on floor 4. The paper 2 travels from the stand 3 over and under a plurality of alignment rollers 5, 6 and 7 so as to present a proper approach to a pre-coat chemical treatment station indicated generally at 8. At this pre-coat station 8, the paper 2 passes between two presser rollers 9, 10 and a first chemical applicator roller 11. Chemical applicator roller 11 is situated so that upon rotation it will pick up from a first chemical tray 12 (shown dotted) the precoat solution contained therein. This pre-coat solution is a chemical solution which prepares the specialized raw paper to receive the sensitizing solution. As roller 11 turns in engagement with paper 2, the solution is thereby applied to the paper at the pre-coat application point 13. From this point the paper passes to a direction roller 14. As the treated paper turns about direction roller 14, the paper is subjected to a first pressurized air knife 15 which air knife 15 scrapes off the excess chemical that was applied at pre-coat station 8. The air knife 15 is one of a series of high velocity jets which emit pressurized air in the direction of the associated arrow. Chemical removed by air knife 15 is blown into a first chemical tray 12 for re-use by chemical applicator roller 11. The reason for this particular scrape in removing all excess chemical is to insure a homogeneous chemical coat on the paper. This air scrape 15 notwithstanding, the paper is still relatively wet and is passed over direction roller 16 to insure proper entrance to the drying unit 50. In the drying unit 50, the treated side of the paper is intermittently subjected to high velocity re-circulating hot air. When the paper leaves drying unit 50 it passes over direction rollers 17, 18 and is caused to reenter drying unit 50 where the same treated side of the paper is again subjected to an intermittent drying influence to insure that the paper is thoroughly dry before the next chemical application occurs. When the paper leaves drying unit 50 this second time it passes over a series of direction rollers 19, 20 and an alignment roller 21 which effect a proper approach to the sensitizing coat station 22 indicated generally. At this point the paper passes under presser rollers 23, 24 which latter rollers effect an engagement of the paper 2 with sensitizing roller 25 at application point 26. Sensitizing roller 25 is adapted to pick up from a second chemical tray 27 (shown dotted) sensitizing solution to be applied to the paper at sensitizing application point 26. This particular side of paper 2 is the same side previously treated at the pre-coat station 8. This sensitizing station 22 is similar to pre-coat station 8 except that here a different sensitizing solution is used. This particular sensitizing solution is the light sensitive solution which produces the diazo print. After the paper leaves coating station 22 it passes direction roller 28. As the paper makes its turn about direction roller 28 it is subjected to the influence of pressurized air knife 29 which scrapes any excess chemical therefrom into the second chemical tray 27 to be re-used by sensitizer roller 25. The effect of air knife 29 here is to insure an even coat of sensitizing chemical on the paper. To insure a proper re-entrance of the paper into the drying unit 50, an alignment roller 30 is provided. At this point, the side treated at the sensitizing station 22 is intermittently subjected to the influence of jets of high velocity recirculating hot air. Upon leaving drying unit 50, the paper passes over an alignment roller 31 so as to insure proper approach to the wet-back station 32 (indicated generally). At wet-back station 32, the paper passes under presser rollers 33, 34 and over wet-back roller 35 so as to effect engagament of the paper to wet-back roller 35. Wet-back roller 35 is adapted to turn so as to pick up water from a water tray 36 and apply said water to the paper at water application point 37. When the paper leaves wet-back station 32 it passes around a direction roller 81 where the side just treated with water is subjected to the influence of a third air knife 38 which scrapes off excessive water and leaves a smooth coat of wet-back paper. The reason for wet-back station 32 is that the paper has been wet and dried in sequence two times and because of this wetting and drying of the same side, the paper has become distorted into undesirable curls. Therefore, the wet-back application, which is water, is an application to the side of the paper as yet untreated. Leaving this point, the paper engages an alignment roller 39 to insure proper entrance into the drying unit 50 for a final intermittent exposure of both sides to jets of high velocity recirculating hot air. After wetting the back side of the paper, scraping it and sending it through the drying unit 50, correction of the curl and distortion therein is effected leaving a desirable shrunk flat surface to the paper. When the paper leaves drying unit 50 for the last time, it passes over alignment roller 40, 41 and to presser rollers 42, 43 which effect the paper pressure necessary for the proper engagement with, and proper operation of, a main drive roller 44. Main drive roller 44 may effect what is known as a "chill roll" in view of the fact that inlet and exhaust flexible couplings thereto (not shown) allow for water to be circulated therethrough thereby eliminating undesirable heat from the paper that may as yet be contained therein after leaving drying unit 50. The main drive roller 44 pulls the paper through the entire machine and is drawn by its own drive motor (not shown). The paper then passes an alignment roller 45 to insure a proper final roll 46 which is perfected on the wind-up stand 47 indicated generally. Wind-up stand 47 comprises a pair of final rollers on which the final roll 46 is perfected. One of the final rollers 48 may be a driven roller and the other final roller 49 be an idler roller. If so desired both final rollers 48, 49 may be synchronously driven. As the size of the final roll 46 increases, it is retained on the final rollers by sheer weight and the use of a plurality of parallel and vertical guide rails 51. Final drive roller 48 is over-driven very slightly, about 2% to 3% more than is main drive roller 44 in order to perfect a hard type final roll 46. Final drive roller 48 and main drive roller 44 may be driven by the same motor (not shown). The paper inside the machine is under very little tension in spite of the use of an appropriate momentum brake means (not shown) at the stand 3. The over-all speed of the paper travel is effected by any suitable variable pulley mechanism constrained to control the main drive 44. The final roll 46 is dried to a desirable moisture content of approximately 2% to 5%. Paper that is rolled too dry will become brittle upon aging when stored. If the final roll is too wet due to insufficient chemical evaporation, spoilage will occur due to the effect of humidity and heat on the excessive chemical. The drying unit 50 is divided into a plurality of hot air intake chambers 51, 52, 53, which receive pressurized hot air from a furnace, later to be described, and a corresponding plurality of exhaust chambers 54, 55, 56. The hot air is forced from the intake chambers into their contiguous exhaust chambers through a plurality of longitudinally extending jet means 57. In the case of the hot air intake chamber 51 and its respective lower exhaust chamber 54, it can be seen that the hot air (arrows) strikes the paper on the top side only and is drawn off through chamber 54 as later to be described. It can also be seen that between the jets in partition wall 58, the paper is exposed to relatively little heat treatment. In the case of the hot air intake chamber 52 and its respective upper exhaust chamber 54, it can be seen that the air is emitted through jet means 57 and strikes only the bottom side of the paper and that the paper is exposed to relatively little heat treatment in the spaces beween the jets on partition wall 59. As to the same hot air intake chamber 52 and its respective lower exhaust chamber 55, the air through the jet means 57 strikes only the top of the paper and intermittently along partition wall 60. As to the hot air intake chamber 53 and its respective upper exhaust chamber 55, it can be seen that the hot air strikes only the bottom side of the paper and intermittently along partition wall 61. So it follows with hot air intake chamber 53, its associated lower exhaust chamber 56 and the jets along partition wall 62. In order to prevent damage to the paper as it passes through the drying unit, there is suitably provided a plurality of separation and support bars 63. Along the side of drying unit 50 is provided a series of accessibility doors 80.

FIG. 2

FIG. 2 is a cross section of each of the jet means 57. There is a perforated static plate 64 on the inside of the heat chamber covering the entrance of the jet 65. As the hot air is blown through the heat chamber from the furnace source at high velocity, it comes whipping through in erratic and cyclonic motions and this static plate 64 is shaped to fit over the jet entrance so that the flow of air can enter the jets therethrough. The plate 64 blocks off just enough air so that pressure may be built up and be forced out through the jets at a smooth, even rate. Without this static plate 64, the air would whip out of the jets in various uneven velocities across the paper. The purpose for effecting a smooth, even rate of air flow is to dry the paper evenly and have the moisture content across the entire width of the paper uniform from one side to the other and, of course, in the middle. The static plate 64 also prevents the air from coming out the jet in intermittent blasts causing uneven and spotted dryness which would produce different densities in the paper. These uneven densities are obvious defects which would show in the finished product as a blueprint since one side would print darker than the other—namely the wetter side. Also the wetter side would react to humidity and heat much quicker and would spoil; and, of course, either one or both of these would make the paper commercially inferior.

FIG. 3

FIG. 3 discloses the general over-all relationship of the major components of the invention. Beginning with a suitable fan 66, air is generated thereby and forced therefrom through a duct means 67 and into a suitable furnace 68 from which the hot air is obtained and forced through duct means 69, 70, 71 directly into the drying unit 50. Once inside the drying unit 50 and after the air passes through the jets and onto the paper, the dissipated air is immediately drawn off into a plenum 72 which acts as an exhaust chamber to direct a major portion of the exhausted air into a manifold duct 73 then to the fan return duct 74. The minor portion (20%) of the dissipated air is exhausted into a lower separate portion 77 of the plenum 72 and is exhausted to the atmosphere through duct means 75. The purpose of this minor portion exhaust is to remove a certain amount of the moisture and to prevent any surplus build-up of humidity within the system. The position of the paper 2 is shown relative to entering drying unit 50 from the right and leaving drying unit 50 to the left thereof.

FIG. 4

FIG. 4 is a cross sectional end view of the drying unit 50 showing the hot air intake chambers 51, 52, 53, partitions 58, 59, 60, 61 and 62, and the exhaust chambers 54, 55 and 56 with each exhaust chamber having a cross section of paper 2 therein, their respective jet means 57, and their respective support and separation bars 63. The path of the hot air is as shown by the intake and exhaust chamber arrows and then back into the plenum 72 which surrounds but is separate from the plenum ducts 71, so that the air in plenum 72 is ambient to plenum duct 71 but there is no air transfer therebetween. The dissipated air is then forced into either the large exhaust chamber 76 or the small plenum exhaust chamber 77, which latter chamber is divided from the former by partition 78. The air that is exhausted into the large plenum exhaust chamber 76 is directed into the manifold duct 73 then to the fan return duct 74 to be re-circulated to the furnace and drying unit 50. The air that was exhausted itno small plenum exhaust chamber 77 is approximately 20% of the fan return air and is exhausted into the atmosphere to reduce humidity in the drying unit 50.

FIG. 5

FIG. 5 is an isometric view of the drying unit 50, the plenum 72 and associated duct work. The plenum ducts 71 extend through the plenum 72 and will direct hot air to the paper in the drying unit 50. The dissipated air is drawn back to either large plenum exhaust chamber 76 or small plenum exhaust chamber 77, which latter exhaust chamber is divided from the former exhaust chamber by means of partition 78. The air in exhaust chamber 76 is then directed into the manifold 73 and fan return duct 74. The dissipated air drawn into exhaust chamber 77 is exhausted to the atmosphere by means of ducts 75. This exhaust can be under the influence of an exhaust fan (not shown). Shown on drying unit 50 are a plurality of slots 82 which allow the paper to enter or leave the drying unit 50. In a case where there is provided a high capacity furnace-fan relationship and rapid exhaust from drying unit 50 is desirable, the manifold 73 can be enlarged to wrap around the plenum ducts 71.

FIG. 6

FIG. 6 is a schematic view of the air source and distribution to the air knives 15, 29 and 38. The source of air here is a self-driven high velocity fan 79 that blows air to each air knife in turn, there being no return duct for this system, in view of the fact that the air is exhausted into the atmosphere.

Having thus disclosed and described my invention I claim:

1. The process of making a diazotype paper having a uniform light-sensitive coating thereon which comprises first coating one side of a sheet of raw paper with a water solution of a diazotype precoat chemical; drying said precoat chemical to a moisture content in the range of 2 to 5% by briefly exposing said coated side at regular intervals to a jet of hot air directed forcefully against the coated surface in a narrow strip having a substantially uniform velocity across the entire width of the coated surface; coating said dried precoated side with a water solution of a light-sensitive diazo chemical; drying said light-sensitive coating to substantially reduce the moisture content thereof by briefly exposing the coated surface at regular intervals to said hot air jet; wetting the uncoated side of the coated paper sheet with water; and drying said coated side and said wetted side simultaneously to a moisture content in the range of 2 to 5% by briefly exposing each of said sides at regular intervals to said hot air jet.

2. The process as recited in claim 1 wherein an excess of chemical is applied during each of said coating steps and said excess removed by a blast of air from an air knife, and an excess of water is applied in said wetting step and said excess water removed by a blast of air from an air knife.

3. The process as recited in claim 1 wherein the major portion of air forming said hot air jet is comprised of reheated and recirculated air which has previously been directed against said coated and wetted surfaces.

4. The process as recited in claim 3 wherein said reheated and recirculated air comprises at least 80% of said hot air jet.

References Cited

UNITED STATES PATENTS

| | | | |
|---|---|---|---|
| 2,337,344 | 12/1943 | Partridge | 117—34 |
| 2,993,803 | 7/1961 | Sulich | 117—34 |
| 3,027,256 | 3/1962 | Klimkowski | 96—49 |

WILLIAM D. MARTIN, Primary Examiner

W. R. TRENOR, Assistant Examiner

U.S. Cl. X.R.

117—62, 119.8